United States Patent [19]

Greenhalgh

[11] 3,902,492
[45] Sept. 2, 1975

[54] CATHETER

[76] Inventor: Roger Malcolm Greenhalgh, 271 Sheen Ln., East Sheen, London, SW14 8RN, England

[22] Filed: May 14, 1974

[21] Appl. No.: 469,801

[30] Foreign Application Priority Data
May 14, 1973 United Kingdom............... 22798/73

[52] U.S. Cl. .............................. 128/241; 128/349 B
[51] Int. Cl. ............................................ A61m 3/00
[58] Field of Search ........... 128/241, 246, 245, 349, 128/350, 351, 348, 325, 344

[56] References Cited
UNITED STATES PATENTS

| | | | |
|---|---|---|---|
| 3,046,988 | 7/1962 | Moreau et al. ...................... | 128/325 |
| 3,144,868 | 8/1964 | Jascalevich...................... | 128/349 B |
| 3,394,705 | 7/1968 | Abramson...................... | 128/241 X |

OTHER PUBLICATIONS
Am. Cystoscope Makers Inc., 1961 Catalogue, FIG 2339, p. 15, FIG. 2509, p. 10.

Primary Examiner—Richard A. Gaudet
Assistant Examiner—J. Yasko

[57] ABSTRACT

A catheter for the continuous irrigation of the bladder which has a drainage tube for the removal of fluid from the bladder, an auxiliary axial bore extending through the wall of the drainage tube, and an irrigation tube extending from the axial bore beyond the tip of the catheter. The irrigation tube has a plurality of radial discharge outlets. During use, the irrigation tube curves around the bladder; fluid passes through the irrigation tube to provide a discharge spray and a turbulent flow of liquid in the bladder. This provides for a peripheral bladder irrigation which is an improvement over a single discharge point near the entry of a catheter into a bladder. The catheter also preferably has a second axial bore in its wall which terminates in an opening beneath a sheath of expandable material which can be inflated by fluid applied under pressure through the second axial bore, to secure the catheter in place.

14 Claims, 4 Drawing Figures

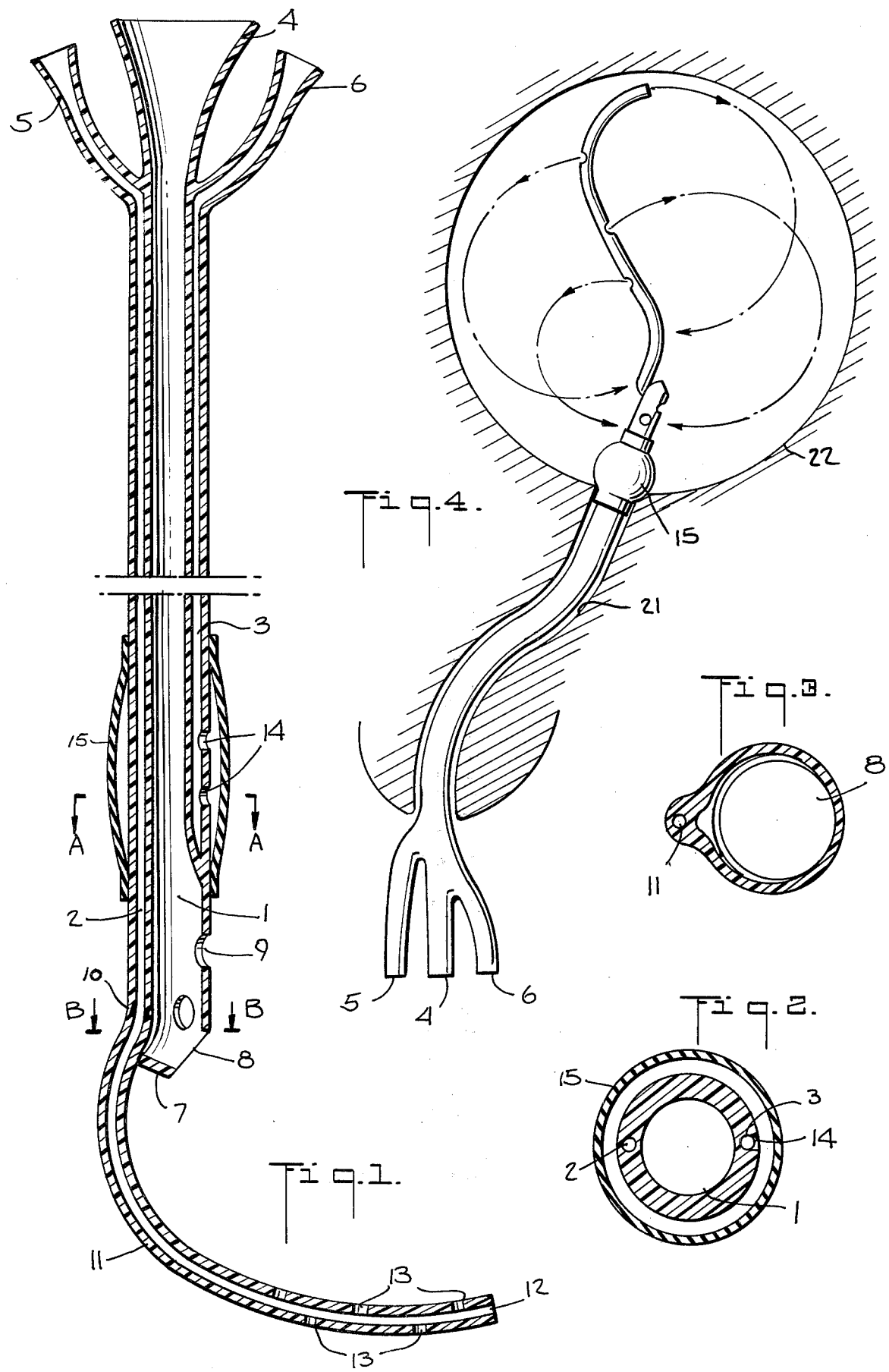

CATHETER

THE INVENTION

This invention relates to catheters for the continuous irrigation of a body cavity following a surgical operation, especially for irrigation of the bladder following prostatectomy.

One of the hazards of prostatectomy is that the wound left by the removal of the prostate gland will frequently leak blood into the bladder with the risk that blood clots will form in the bladder unless steps are taken to irrigate the bladder.

Two methods of irrigation are in common use. Continuous irrigation involves the use of two catheters: a drainage catheter inserted through the urethra; and an irrigation catheter inserted through an incision in the abdominal wall.

The use of a separate irrigation catheter involved obvious disadvantages and it has therefore become the practice to use a single catheter for intermittent introduction of irrigation liquid and drainage. Intermittent irrigation is unsatisfactory inter alia because it requires the attention of a nurse to carry out the irrigation.

This invention provides a catheter for continuous irrigation of a body cavity which gives efficient irrigation with a single catheter. Further the use of the catheter of the invention greatly decreases the risk of blood clot retention and wound fistula and normally results in a shorter stay in hospital for the patient.

The catheter according to the invention has an auxiliary axial bore extending through its wall to terminate at or towards the tip of the catheter on its external surface and an irrigation tube extending from the axial bore beyond the tip of the catheter and having a plurality of radial discharge outlets at least towards its free end, and preferably along its whole length.

In use, for bladder irrigation, the catheter is inserted through the urethra into the bladder. Irrigation liquid is passed through the auxiliary bore and sprays out of the discharge outlets in various directions, against the peripheral wall of the bladder thus causing a turbulent flow of liquid in the bladder. Urine and spent irrigational liquid passes from the bladder through the lumen of the catheter. In general, for ease of insertion of the catheter, the irrigation tube is tucked into the lumen of the catheter and is pulled out by the surgeon when the catheter is in position. The lumen of the catheter therefore preferably has a greater internal diameter than the external diameter of the irrigation tube.

The catheter will generally be provided at its tip with one or more radial drainage orifices in addition to an axial orifice.

Preferably the catheter also has a second bore in its wall. This second bore terminates in an opening in the surface of the catheter beneath a sheath of expandable material, for example latex, which can be inflated by fluid applied through the bore and this holds the catheter in position. This is not necessary when the catheter is to be used in such a position that it will not be readily accidentally removable or when the tip of the catheter has a radial bore through which a suture can be passed to stitch the catheter into position.

The catheter may be made of any material that is conventionally used in the manufacture of catheters and is preferably made from a flexible plastics material for example plasticised polyvinyl chloride.

The outside diameter of the catheter is advantageously 20 to 24 French gauge, preferably about 21 French gauge and the outside diameter of the irrigation tube advantageously about 8 French gauge. The length of the irrigation tube may be varied as described but is preferably about 4 to 6 inches. The discharge outlets in the irrigation tube are conveniently spaced at a distance of about one-half inch from each other.

The invention will now be described in greater detail by way of example, with reference to the drawings in which:

FIG. 1 is a section through one form of catheter;

FIG. 2 is a section on line A—A of FIG. 1;

FIG. 3 is a section on line B—B of FIG. 1; and

FIG. 4 is a diagrammatic view showing the catheter of FIG. 1 in position in the bladder.

Referring to the drawings, as shown in FIGS. 1 to 3 the catheter which is made from flexible polyvinyl chloride has a lumen 1 and in its wall has two axial bores 2 and 3, respectively.

One end of the catheter is of tridentate form; the three branches 4, 5 and 6, respectively, comprising the end of the lumen 1, and of the two bores 2 and 3. Branch 4 comprising the end of the lumen 1 is connectable to a receiver for urine and spent irrigation liquid, branch 5 is connectable to a source of irrigation liquid and branch 6 is connectable to a source of compressed fluid via a valve (not shown).

The lumen 1 of the catheter at the tip 7 thereof has an axial orifice 8 and one or more radial orifices 9.

Bore 2 terminates in the outer surface of the walls of the catheter at 10 and an irrigation tube 11 extends from the bore 2 beyond the tip 7 of the catheter. The tube 11 has an outlet orifice 12 at its end and a number of orifices 13 spaced along its length.

Bore 3 terminates in the outer surface of the wall of the catheter at orifice 14 beneath a sheath 15 of rubber latex or other expandable material.

FIG. 4 shows the method of use of the catheter for bladder irrigation. The catheter is inserted through the urethra 21 of the patient into the bladder 22. Fluid is passed through bore 3 (branch 6) to inflate the sheath 15 to prevent accidental removal of the catheter. Irrigation liquid is passed through bore 2 (branch 5) and flows around the bladder, including the periphery thereof, i.e. as shown by the arrows in FIG. 4, and then drawn from the bladder together with any urine through the lumen 1 (branch 4) of the catheter. During introduction of the catheter the irrigation tube 11 may be tucked into the drainage lumen 1. Alternatively the catheter may be inserted with the irrigation tube extended outward. When the flexible irrigation tube is placed in the bladder, it curves around the bladder wall, since the length of the tube is greater than the diameter of the bladder, and provides peripheral irrigation at the bladder wall. This is superior to irrigation from a single point near the entry of the catheter into the bladder.

This invention has been described in terms of specific embodiments set forth in detail. Alternative embodiments will be apparent to those skilled in the art in view of this disclosure, and accordingly such modifications are to be contemplated within the spirit of the invention as disclosed and claimed herein.

What is claimed is:

1. A catheter for continuous irrigation of a body cavity, having a drainage tube for the removal of fluid from said body cavity, an auxiliary passageway extending along the catheter and terminating at or towards the tip of the catheter and a flexible irrigation tube extending from said auxiliary passageway beyond the tip of the catheter for a length of from about 4 to 6 inches and having a plurality of radial discharge outlets at least towards its free end wherein the flexibility and length of said irrigation tube are adapted to facilitate its curving around the wall of said body cavity and providing peripheral irrigation thereof.

2. The catheter of claim 1 wherein said auxiliary passageway is an axial bore extending through the wall of said drainage tube.

3. The catheter of claim 2 wherein the discharge outlets of the irrigation tube are radially distributed along the whole length thereof.

4. The catheter of claim 1 which is provided at its tip with one or more radial outlets from said drainage tube.

5. The catheter of claim 1 which has a second auxiliary passageway, said second auxiliary passageway terminating in an opening beneath a sheath of expandable material which can be inflated by fluid applied under pressure through said second auxiliary passageway.

6. The catheter of claim 5 wherein said second auxiliary passageway is an axial bore extending through the wall of said drainage tube.

7. The catheter of claim 1 manufactured from flexible polyvinyl chloride.

8. The catheter of claim 5 wherein the sheath is made from rubber latex.

9. The catheter of claim 1 having an external diameter of from 20 to 24 French gauge.

10. The catheter of claim 1 wherein the irrigation tube has an external diameter of approximately 8 French gauge.

11. The catheter of claim 1 wherein said irrigation tube is adapted to fit into said drainage tube to facilitate insertion of the catheter into said body cavity.

12. The catheter of claim 1 wherein the external diameter of said irrigation tube is smaller than the internal diameter of said drainage tube.

13. The catheter of claim 1 wherein said irrigation tube is an integral part of said catheter body.

14. The catheter of claim 1 wherein the flexibility and size of said irrigation tube are adapted to facilitate placement of said irrigation tube into said drainage tube for insertion into said body cavity.

* * * * *